US008271605B2

(12) United States Patent
Torrant et al.

(10) Patent No.: US 8,271,605 B2
(45) Date of Patent: *Sep. 18, 2012

(54) SYSTEM AND METHOD FOR MANAGING DISTRIBUTED OBJECTS AS A SINGLE REPRESENTATION

(75) Inventors: Marc D. Torrant, Sacramento, CA (US); Paul Baleme, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1272 days.

This patent is subject to a terminal disclaimer.

(21) Appl. No.: 11/963,494

(22) Filed: Dec. 21, 2007

(65) Prior Publication Data

US 2008/0098407 A1 Apr. 24, 2008

Related U.S. Application Data

(62) Division of application No. 10/393,622, filed on Mar. 21, 2003, now Pat. No. 7,313,619.

(51) Int. Cl.
*G06F 9/44* (2006.01)
*G06F 9/46* (2006.01)
*G06F 15/173* (2006.01)
*G06F 15/16* (2006.01)
*G06F 15/177* (2006.01)

(52) U.S. Cl. ........ 709/213; 709/225; 709/202; 719/316; 719/317

(58) Field of Classification Search .......... 709/200–203, 709/213, 217–228; 719/324, 312–318, 310
See application file for complete search history.

(56) References Cited

U.S. PATENT DOCUMENTS

| 5,872,973 A | 2/1999 | Mitchell et al. |
| 6,308,163 B1 | 10/2001 | Du et al. |
| 6,553,428 B1 | 4/2003 | Ruehle et al. |
| 6,615,166 B1 | 9/2003 | Guheen et al. |
| 6,628,965 B1 | 9/2003 | LaRosa et al. |

(Continued)

FOREIGN PATENT DOCUMENTS

JP 2000-187632 7/2000

(Continued)

OTHER PUBLICATIONS

Non-Final Office Action for U.S. Appl. No. 11/950,354 Mailed Jan. 30, 2009, 8 Pages.

(Continued)

*Primary Examiner* — Haresh N Patel
(74) *Attorney, Agent, or Firm* — Blakely, Sokoloff, Taylor & Zafman LLP

(57) ABSTRACT

An architecture and method for managing at least two distinct machines (or objects) in which resources are shared as a single entity (or object) in an agent-based system. The agent-based system comprising a controller, a local agent coupled to the controller, and at least one clustered machine. The at least one clustered machine includes at least two individual agents, the at least two individual agents sharing at least one shared resource/service. The system also includes a virtual non-persistent connection for coupling the at least two individual agents to the local agent. The at least one shared resource/service is accessed by the local agent through the virtual non-persistent connection using a virtual IP address to enable the at least two individual agents of the at least one clustered machine to be represented as a single object.

6 Claims, 8 Drawing Sheets

U.S. PATENT DOCUMENTS

| | | | |
|---|---|---|---|
| 6,915,521 | B1 | 7/2005 | Monteiro |
| 7,051,341 | B2 | 5/2006 | Burton et al. |
| 7,069,413 | B1 | 6/2006 | Agesen et al. |
| 7,171,441 | B2 | 1/2007 | Shiouchi et al. |
| 7,831,713 | B2 * | 11/2010 | Torrant et al. .................. 709/225 |
| 2001/0018673 | A1 | 8/2001 | Goldband et al. |
| 2002/0116544 | A1 | 8/2002 | Barnard |
| 2002/0120741 | A1 | 8/2002 | Webb et al. |
| 2002/0152235 | A1 | 10/2002 | Motoyama et al. |
| 2002/0152262 | A1 | 10/2002 | Arkin et al. |
| 2002/0152305 | A1 | 10/2002 | Jackson et al. |
| 2003/0023669 | A1 | 1/2003 | Delima et al. |

FOREIGN PATENT DOCUMENTS

| | | |
|---|---|---|
| WO | WO-0029949 | 5/2000 |
| WO | WO-02003203 | 10/2002 |

OTHER PUBLICATIONS

Notice of Allowance and Fees for U.S. Appl. No. 11/950,354 Mailed Jun. 30, 2010, 5 Pages.

International Preliminary Report on Patentability for PCT Application No. PCT/US2004/005665 Mailed Oct. 6, 2005, 8 Pages.

Non-Final Office Action for Great Britain Patent Application No. GB0513764.1 Mailed Feb. 8, 2006, 5 pages.

Non-Final Office Action for Taiwan Patent Application No. 93104983 Mailed Apr. 6, 2005, 6 Pages.

Final Office Action for Japanese Patent Application No. 2005-518882, Mailed Dec. 9, 2008, 4 Pages.

Non-Final Office Action for U.S. Appl. No. 11/950,354 Mailed Dec. 4, 2007, 12 pages.

IPO of India, "Examination Report", India Patent Application No. 3972/DELNP/2005, (Jul. 10, 2008), 1-2.

IPO of India, "First Examination Report", India Application No. 3972/DELNP/2005, (Oct. 8, 2007), 1-2.

Japan Patent Office, "Office Action", Japanese Application No. 2005-518882, mailed May 13, 2008, 1-9.

KIPO, "First Notice of Preliminary Rejection" with translation, Korean Patent Application No. 10-2005-7017703, (Nov. 16, 2006), 1-4.

KIPO, "Second Notice of Preliminary Rejection" with translation, Korean Patent Application No. 10-2005-7017703, (Jan. 7, 2008), 1-7.

German Patent & Trademark Office, "Office Action" with translation, German Patent Application No. 11 2004 000 460.8, (Aug. 25, 2008), 1-6.

"International Search Report and Written Opinion", International application No. PCT/US2004/005665 mailed Aug. 18, 2005, 1-14.

"U.S. Office Action", Non-final Office Action, U.S. Appl. No. 10/393,622 mailed Jan. 8, 2007, 1-46.

"U.S. Office Action", Notice of Allowance, U.S. Appl. No. 10/393,622 mailed Aug. 10, 2007, 1-17.

U.S. Appl. No. 09/895,999, filed Jun. 30, 2001, 1-43.

Brim, Michael, et al., "Cluster Command & Control (C3) Tool Suite", *Parallel and Distributed Computing Practices*, http://orca.usm.edu.pdcp, (Dec. 31, 2000), 1-20.

Horms, Simon H., "Creating Redundant Linux Servers", *Presented at 4th Annual Linux Expo*, (May 1998), 1-18.

Short, Rob, et al., "Windows NT Clusters for Availability and Scalability", *COMPCON '97. Proceedings, IEEE San Jose, USA, IEEE Comput. Society*, (Feb. 23, 1997), 1-6.

* cited by examiner

SYSTEM AND METHOD FOR MANAGING DISTRIBUTED OBJECTS AS A SINGLE REPRESENTATION

CROSS REFERENCE TO RELATED APPLICATIONS

This application is a divisional of U.S. application Ser. No. 10/393,622 filed on Mar. 21, 2003, the disclosure of which is incorporated herein by reference in its entirety for all purposes.

BACKGROUND OF THE INVENTION

1. Field of the Invention

The present invention is generally related to the field of network management. More particularly, the present invention is related to an architecture and method for managing distributed objects as a single representation in an agent-based system.

2. Description

Traditional Internet data centers are characterized as being extensions of corporate data centers with the addition of hardware for Web and e-Commerce servers. Management of traditional Internet data centers consisted of applying constraints and simplifying assumptions of the hardware and its operations. For example, services within a data center might use a client-server object and transport model to simplify the protocols and intelligence supported by the data center.

As businesses continue to make larger investments in the Internet economy, constraints that were once key to the management of Internet data centers are no longer adequate. For example, conventional management tools manage and monitor a limited number of components in the Internet data center, thus leaving the responsibility of event-correlation and resolution options for an operator or administrator to handle.

Today, the growing complexities of deployment, operation, and maintenance of Internet services make management and scalability of Internet data centers very difficult. As Internet services continue to grow, the tasks to be performed by the operator or administrator become more burdensome. To alleviate some of the burdensome tasks required of the operator, management of many of the components of the Internet data center are being automated.

One such architecture for automating management processes is open control technology. Open control technology is a network/service control technology targeted at enterprise level service management. Open control technology architecture describes a structure for managing components of a data center service throughout the service lifecycle. The architecture is deployed as an open control technology pod. The open control technology pod is composed of a controller and a customer pod. The architecture defines an object model that virtualizes the data center. The virtualization is done via abstractions and encapsulation.

A problem associated with the open control technology architecture arises when the customer pod contains a set of cluster resources/services, be it software or hardware, where at least two distinct machines, represented as objects, share a common resource/service. The distinct machines may also contain non-clustered resources/services that also need to be managed and monitored. When clustered resources/services are managed and monitored, the distinct machines or objects need to be represented as a single object. When non-clustered resources/services are managed and monitored, the distinct machines or objects need to be represented as separate objects. Traditional open control technology architecture is not equipped to manage and monitor clustered resources where at least two distinct machines or objects need to be represented as a single object in order to share one or more common resources/services.

Thus, what is needed is an architecture and methodology for representing distinct machines as a single entity or object for enabling the distinct machines to share one or more common resources or services.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Embodiments of the present invention are directed to an architecture and method for managing at least two distinct machines (or objects) in which resources are shared as a single entity (or object) in an agent-based system. Although embodiments of the present invention are described with respect to open control technology in an agent-based framework, embodiments of the invention may be applied to any agent-based system in which multiple managed machines or objects share resources. Prior to describing embodiments of the present invention, example environments in which embodiments of the present invention may be implemented will be described.

Figure 1:
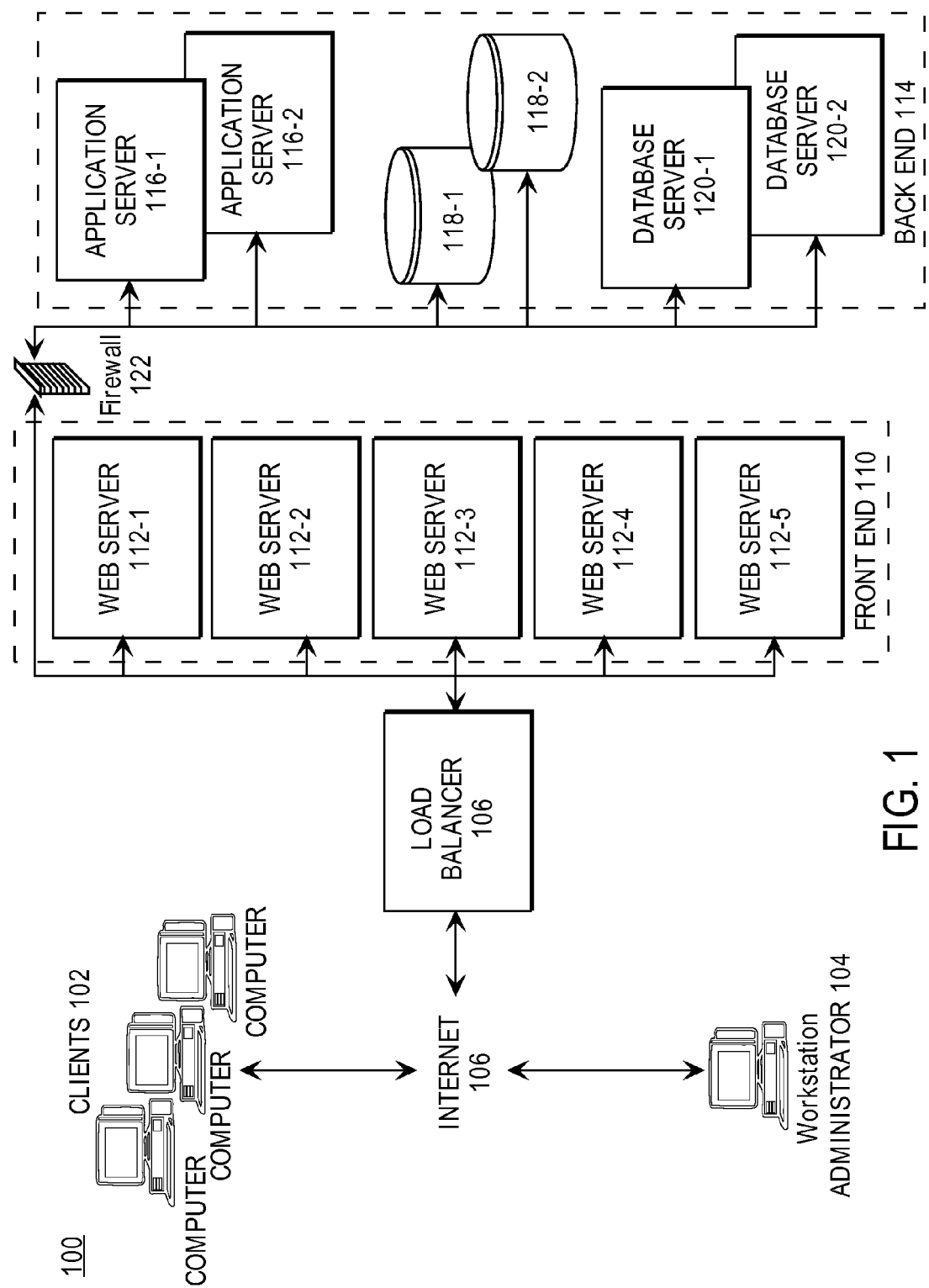
FIG. 1 illustrates an exemplary block diagram of an Internet data center.

FIG. 1 illustrates an exemplary block diagram of a typical Internet data center 100. As shown in FIG. 1, a typical Internet data center includes a plurality of computers, networking equipment, and appliances. Internet data center 100 comprises the Internet 106, a load balancer 108, a front end 110, a back end 114, and a firewall 122. Clients 102 and an administrator 104 are coupled to Internet 106 via an Internet browser (not shown) for communicating with and/or managing and monitoring Internet data center 100, respectively. Load balancer 108 is coupled to Internet 106, front end 110, and backend 114 via firewall 122. Firewall 122 is coupled to load balancer 108, front end 110, and back end 114.

Front end 110 comprises a plurality of Web servers 112-1 . . . 112-5. Web servers 112-1 . . . 112-5 are computer systems that deliver or serve up Web pages to a browser for viewing by a user, such as a client 102 and/or an administrator 104. Web servers 112-1 . . . 112-5 store HTML (hypertext markup language) documents in order for users to access the documents on the Web.

Back end 114 comprises two application servers 116-1 and 116-2, two storage devices 118-1 and 118-2, and two database servers 120-1 and 120-2. Applications servers 116-1 and 116-2 are computer systems that handle all application operations between users and an enterprise's backend business applications or databases. Application servers 116-1 and 116-2 are typically characterized as having built-in redundancy, high performance distributed application services, and support for complex database access. Storage devices 118-1 and 118-2 are used to store information and are well known to those skilled in the relevant art(s). Database servers 120-1 and 120-2 are computer systems that process queries. Database servers 120-1 and 120-2 are comprised of database applications. The database applications are divided into two parts. A first part displays the data and interacts with the user (i.e., administrator 104 and/or clients 102). A second part preserves data integrity and handles most of the processor-intensive work, such as data storage and manipulation.

Data transmitted and received over Internet 106 passes through load balancer 108. Load balancer 108 analyzes all incoming data requests from clients 102 and administrator 104 and forwards the requests to an appropriate Web server 112-1 . . . 112-5 in front end 110. The client or administrator request may be for a particular Web page stored on one of Web servers 112-1 . . . 112-5. The Web page may include embedded objects provided by one or more application servers 116-1 and 116-2, one or more storage devices 118-1 and 118-2, and/or one or more database servers 120-1 and 120-2. For security purposes, firewall 122 monitors and controls the data traffic between front end Web servers 112-1 . . . 112-5 and back end application servers (116-1 and 116-2), storage devices (118-1 and 118-2), and database servers (120-1 and 120-2).

Figure 2:
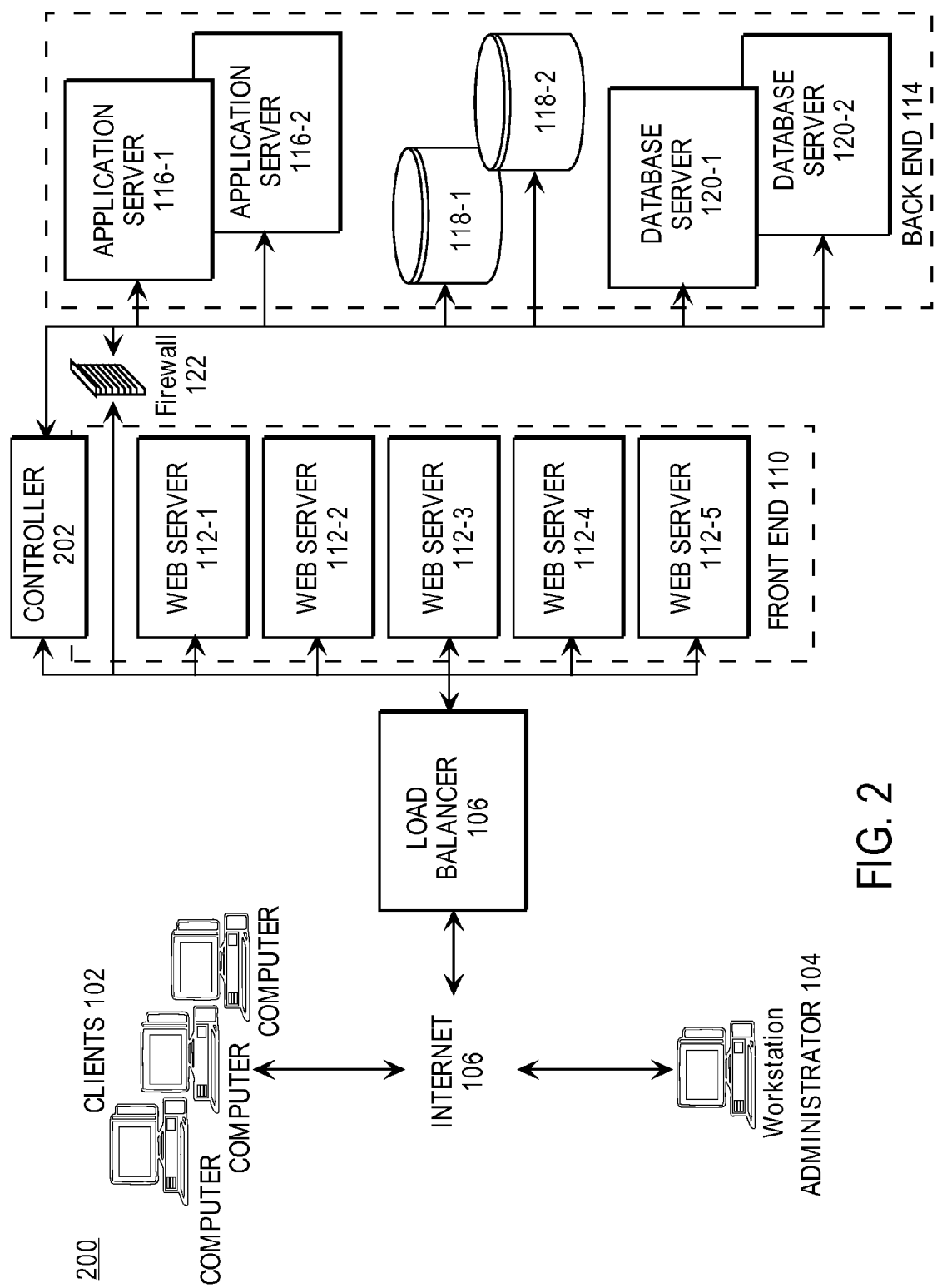
FIG. 2 is a block diagram illustrating an open control technology controller within an Internet data center.

FIG. 2 is a block diagram illustrating an open control technology controller within an Internet data center 200. Open control technology controller 202 is coupled to load balancer 108, front end Web servers 112-1 . . . 112-5, and back end applications servers (116-1 and 116-2), storage devices (118-1 and 118-2), and database servers (120-1 and 120-2). Open control technology controller 202 manages, monitors, and collects information from each component in front end 110 and back end 114.

As previously indicated, open control technology architecture defines an object model that virtualizes the infrastructure of Internet data center 200. The virtualization is done using abstractions and encapsulations. The abstraction hides the complexity of individual service implementations. The encapsulation represents the relationship between various objects in the model.

Figure 3:
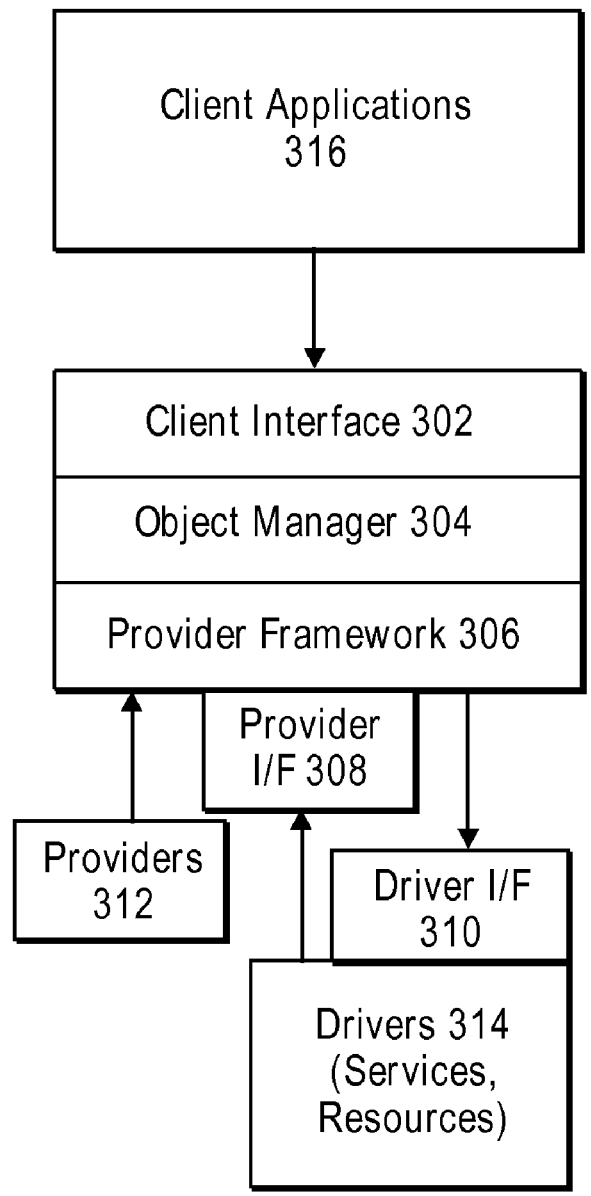
FIG. 3 illustrates an object model for an open control technology architecture.

FIG. 3 illustrates an object model 300 for an open control technology architecture. In embodiments of the invention, the architectural components may be implemented in hardware, software, or a combination thereof. Object model 300 comprises a client interface 302, an object manager 304, a provider framework 306, a provider interface 308, a driver interface 310, providers 312, and drivers 314.

Object manager 304 is used to embody the object model that supports the open control technology architecture. Object manager 304 provides the mechanisms to instantiate and perform operations on instances of objects. Three interfaces are provided to facilitate such operations. The interfaces include client interface 302, provider interface 308, and driver interface 310.

Client interface 302 provides an application programming interface (API) that may be used by client applications 316 to configure, query, and/or manipulate objects provided by object manager 304. An example client application 316 may be a graphical user interface (GUI). The graphical user interface may provide a graphical, external representation of the object model for allowing object instances to be displayed and graphically manipulated. Other client applications 316 may include, but are not limited to, rule engines for predefining rules to respond to events, changes in status, or invocation of methods associated with the objects within object manager 304, and other automated applications.

Driver interface 310 interconnects provider framework 306 with drivers 314. Drivers 314 enable a requested action to be performed on managed services or resources. Services may include, but are not limited to, Web services, Windows services, database services, email services, etc. Resources may include hardware and software components of the system, such as, but not limited to, storage devices, databases, logs, etc. Driver interface 310 is a set of operations (or APIs) through which object manager 304 performs a management operation on a device. Management operations may include, but are not limited to, start, stop, and status requests. A management operation request is transmitted via provider framework 306.

Provider interface 308 interconnects drivers 314 with provider framework 306. When the state of a managed service or resource changes, the interaction between drivers 314, providers 312, and provider framework 306 via provider interface 308 causes an associated property in the object managed by object manager 304 to be reliably and efficiently updated.

Provider framework 306 allows new/different types of providers 312 to be added to object manager 304. Each new/different type of provider 312 may include additional object classes and/or operations to enhance the functionality of object manager 304. As previously indicated, provider framework 306 enables changes to properties represented in an object managed by object manager 304 to be propagated to drivers 314. When one of client applications 316 invokes an object's method via client interface 302, action is reliably and efficiently invoked in drivers 314 by provider framework 306 to ultimately effect the requested action on the managed service or resource.

Figure 4:
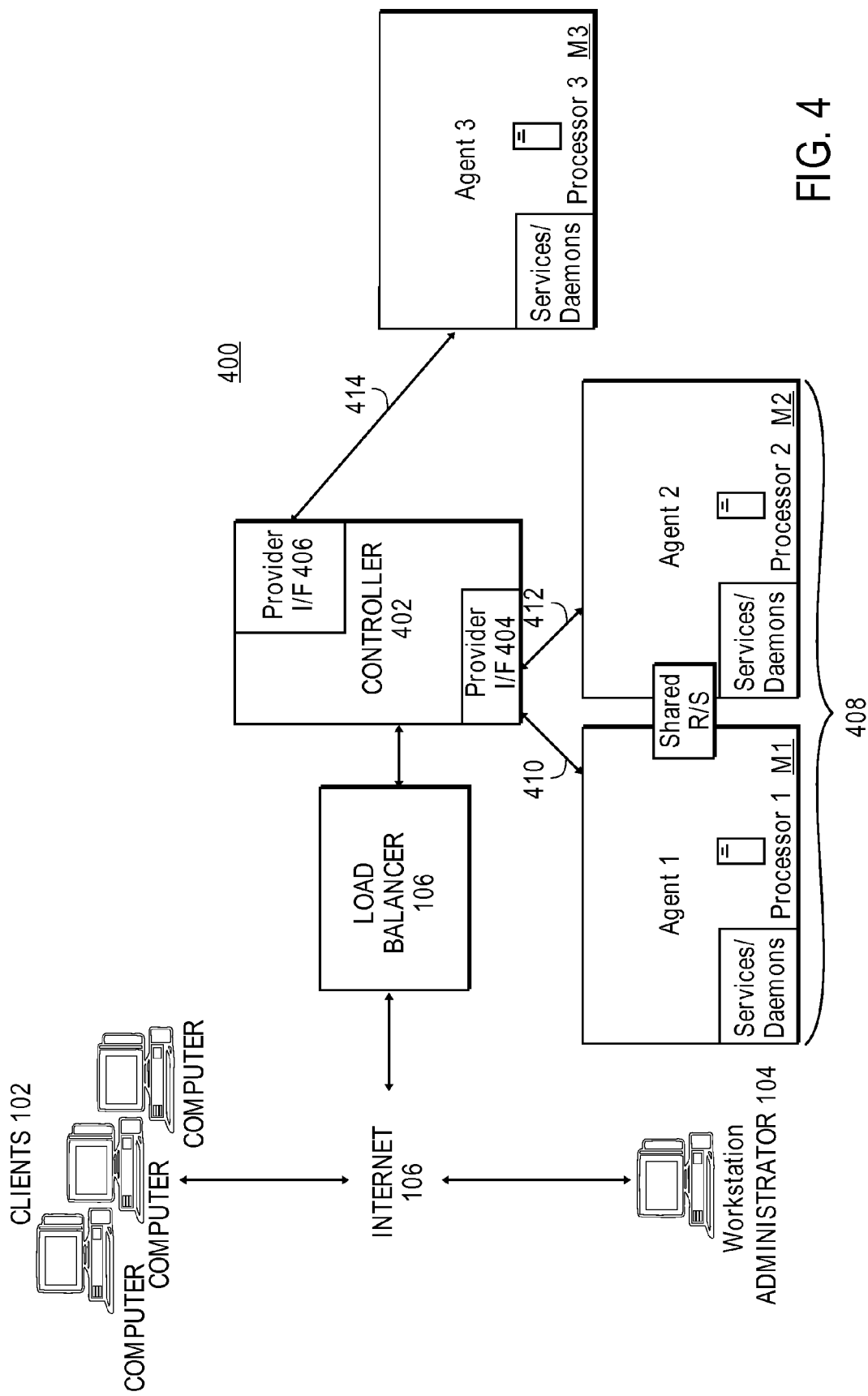
FIG. 4 illustrates a simplified diagram of a typical agent-based open control technology architecture in which problems arise when at least two distinct machines try to share common resources.

As previously indicated, conventional open control technology architecture cannot handle the situation where clustered resources/services are managed and monitored as a single object in an agent-based framework. FIG. 4 illustrates a simplified diagram of a typical open control technology architecture 400 in which problems arise when at least two distinct machines try to share common resources and/or services. Explanations as to why such an architecture does not work will now be explained with reference to FIG. 4.

Architecture 400 comprises a controller 402 and a plurality of machines M1, M2, and M3 representative of an exemplary datacenter. Each of machines M1, M2, and M3 includes an agent (Agent 1, Agent 2, and Agent 3) for interpreting commands from and sending information to controller 402 for each of machines M1, M2, and M3, respectively. Agents 1, 2, and 3 may be implemented in software, hardware, or a combination thereof. Each of machines M1, M2, and M3 is represented as an object according to the object model described above with reference to FIG. 3. Each of machines M1, M2, and M3 includes non-clustered resources/services, such as, but not limited to, processors and/or services/daemons, that must be managed and monitored.

Machines M1 and M2 represent one type of clustered machine 408, known as a failover-clustered machine. In other words, clustered machine 408 is comprised of machines M1 and M2 and clustered resources/services (shown in FIG. 4 as "Shared R/S"). The clustered resources/services are shared by machines M1 and M2, and may include, but are not limited to, windows services, database services, application services, Web services, disks, logs, etc. The purpose of clustered machine 408 is to act as a failsafe system for accessing clustered resources/services. When clustered resources/services are being accessed by controller 402, only one of machines M1 or M2 may access the required shared resource/service at a time. Thus, if machine M1 is available to access the required shared resource/service, then machine M2 is considered to be invalid or inactive. Also, if machine M2 is available to access the required shared resource/service, then machine M1 is considered to be invalid or inactive. Therefore, if machine M1 is inactive, machine M1 will failover and machine M2 will be active, and vice versa.

Controller 402 acts as a management gateway for integrating and managing resources and services provided by machines M1, M2, and M3. Controller 402 comprises, inter alia, provider interfaces (I/Fs) 404 and 406. Provider I/F 404 is coupled to Agents 1 and 2 on machines M1 and M2, respectively, using persistent standard connections 410 and 412, respectively. Provider I/F 406 is coupled to Agent 3 on machine M3 using persistent standard connection 414. Standard connections 410, 412, and 414 provide management connections between the respective Agents (1, 2, and 3) and controller 402.

Controller 402 also communicates with administrator 104 and clients 102 using an Internet browser (not shown) via Internet 106 and load balancer 108. Controller 402 may collect requests for information from administrator 104 and/or clients 102. When the request for information is obtainable from a non-clustered resource/service, controller 402 will generate commands from the requests and send the commands over the appropriate standard persistent connection (410, 412, or 414) to the appropriate Agent (Agent 1, 2, or 3) on the machine (M1, M2, or M3) in which the information is to be retrieved. For non-clustered resources/services, each of machines M1, M2, and M3 act independently as separate objects and, therefore, may all be active at the same time.

Controller 402 communicates with machines M1, M2, and M3 using TCP/IP (Transmission Control Protocol/Internet Protocol), which is well known to those skilled in the relevant art(s). TCP/IP provides a unique IP address for each component in the network or datacenter.

After receiving the commands from controller 402, the appropriate Agent will interpret the commands and perform the necessary function(s) required by the request, such as determining the status of a resource or service, obtaining information from a resource or service, etc. The Agent, after performing the necessary function(s) required by the request, will send the requested information to controller 402. Controller 402 will, in turn, send the information to the requesting entity (i.e., administrator 104 or clients 102).

In order to manage and monitor resources and services on machines M1, M2, and M3, controller 402 may need to obtain information from a particular non-clustered service or resource located on one of machines M1, M2, or M3. In this case, controller 402 will send commands to the appropriate Agent on the machine in which information is to be retrieved over the appropriate persistent standard connection. In turn, the appropriate Agent will interpret the commands and perform the necessary function(s) required to obtain the information. The information may be a status of a resource or service, information from a resource or service, etc. The Agent, after obtaining the information, will send the information to controller 402 over the corresponding persistent standard connection.

As previously stated, the problem with conventional open control technology architecture arises when clustered resources/services in a failover-clustered machine are managed and monitored by controller 402. In the agent-based management and monitoring solution described in FIG. 4, each machine (M1, M2, and M3) is represented as an independent management object that is manipulated and monitored by controller 402 when non-clustered resources/services are utilized. In the case of clustered resources/services that are shared by machines M1 and M2, two objects are required to represent the same shared resources/services. When controller 402 is accessing a shared resource/service from clustered machine 408, only one of machines M1 and M2 will be active. Thus, for example, if controller 402 sends a command to machine M1 for a request for information from a shared resource/service via persistent standard connection 410 and machine M1 is the machine that is inactive, a response back to controller 402 may indicate that machine M1 is inactive or that the resource/service is down. Controller 402 will then assume that the information cannot be retrieved. Yet, the requested information could have been retrieved from machine M2 since the resource/service requested is also accessible from machine M2 and machine M2 is active. However, the architecture presented in FIG. 4 does not allow for a failover to machine M2 to enable the retrieval of the information by machine M2 since the request was sent over persistent standard connection 410. The same is true if the controller had sent commands via persistent connection 412 for machine M2 and machine M2 was inactive, yet the requested information could be retrieved from machine M1.

Embodiments of the present invention are directed to an architecture and method for managing at least two distinct machines (or objects) in which resources are shared as a single entity (or object) in an agent-based system. This is accomplished by employing a local agent that provides non-persistent virtual connections to failover-clustered machines, such as clustered machine 408. Having both a persistent standard connection to a failover-clustered machine for representing the clustered machine as two distinct objects and a non-persistent virtual connection to the failover-clustered machine for representing the clustered machine as a single object enables controller 402 to obtain information from individual non-shared resources/services as well as shared resources/services in a single representation.

Figure 5:
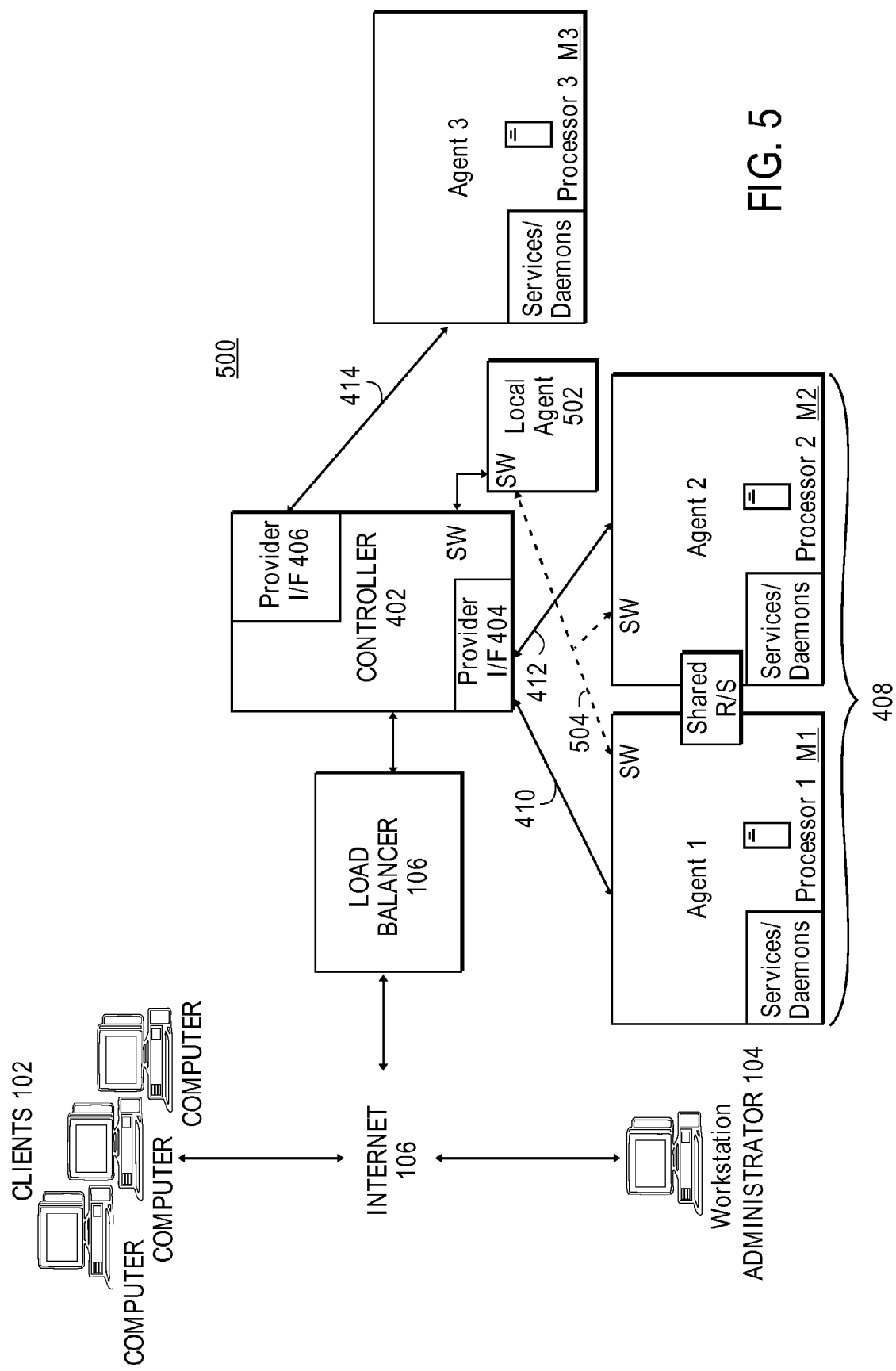
FIG. 5 illustrates a simplified diagram of an agent-based open control technology architecture enabling at least two distinct machines to share common resources according to an embodiment of the present invention.

FIG. 5 illustrates a simplified exemplary diagram of an agent-based open control technology architecture 500 enabling at least two distinct machines to share common resources according to an embodiment of the present invention. Architecture 500 is similar to architecture 400 with the exception of the addition of a local agent 502. In one embodiment, local agent 502 resides within controller 402. In another embodiment, local agent 502 is coupled to controller 402. Local agent 502 may be implemented in software, hardware, or a combination thereof. Local agent 502 may be used to carry out certain tasks that one would not want to perform from another machine. For example, one would not want to query machine M1 to determine if machine M1 is inactive if, in fact, machine M1 is inactive.

In an embodiment of the present invention, local agent 502 is used to provide a virtual non-persistent connection 504 (shown in phantom) to clustered machine 408. Virtual non-persistent connection 504 allows local agent 502 to view clustered machine 408 as a single entity or object. Virtual non-persistent connection 504 enables local agent 502 to connect to both machine M1 and machine M2 using a single unique virtual IP address. For example, machine M1 may be assigned an IP address of 1.2.3.1, machine M2 may be assigned an IP address of 1.2.3.2, and clustered machine 408 may be assigned a virtual IP address of 1.2.3.3. This allows machines M1, M2, and the combination of machines M1 and M2 (clustered machine 408) to each have a unique IP address. Machine M3 would also be assigned a unique IP address, such as, for example, 1.2.3.4.

In one embodiment, local agent 502 is used for accessing shared resources/services from clustered machine 408. As previously stated, only one of machines M1 or M2 may be active at a time when accessing shared resources/services. Therefore, when controller 402 sends commands directed to a shared resource/service to local agent 502, local agent 502 will open virtual connection 504 and send the commands to both machine M1 and M2. Although both machines M1 and M2 receive the commands, only the active machine will respond. This eliminates the need for local agent 502 to know which machine (M1 or M2) is active and will respond to the commands.

With architecture 500, non-clustered resources/services are accessed using persistent standard connections, such as 410, 412, and 414, as described above with reference to FIG. 4.

Figure 6:
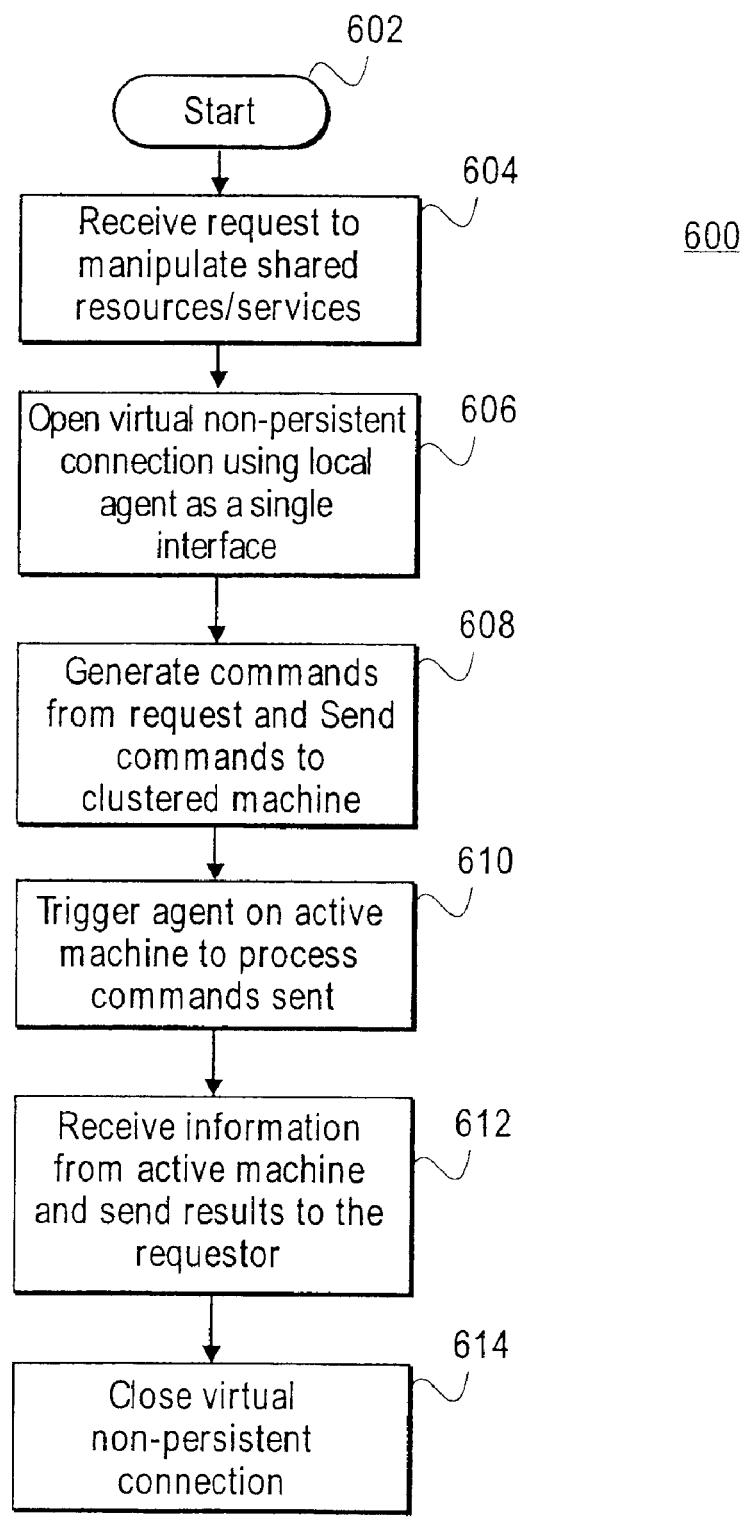
FIG. 6 is a flow diagram describing a method for enabling an agent-based open control technology architecture to handle at least two distinct machines in which common resources are shared according to an embodiment of the present invention.

FIG. 6 is a flow diagram 600 describing a method for enabling an agent-based open control technology architecture to handle at least two distinct machines in which common resources are shared according to an embodiment of the present invention. The invention is not limited to the embodiment described herein with respect to flow diagram 600. Rather, it will be apparent to persons skilled in the relevant art(s) after reading the teachings provided herein that other functional flow diagrams are within the scope of the invention. Embodiments of the invention are also not limited to at least two distinct machines sharing resources/services. One skilled in the relevant art(s) would know that more than two distinct machines may share resources without departing from the scope of embodiments of the present invention. The process begins with block 602, where the process immediately proceeds to block 604.

In block 604, controller 402 receives a request to manipulate one or more of a shared resource and/or a shared service. In one embodiment, the request may come from administrator 104, who is making sure that the machines or servers on the network are operating properly. In another embodiment, the request may come from a user or client 102 who is obtaining information from Internet 106. The process then proceeds to block 606.

In block 606, controller 402 opens a virtual non-persistent connection, such as connection 504 in FIG. 5, to the clustered machine containing the shared resource/service. This is accomplished using local agent 502. The process then proceeds to block 608.

In block 608, controller 402 generates commands from the request and sends the commands through the virtual connection via local agent 502 to the clustered machine containing the shared resources. The process then proceeds to block 610.

In block 610, the active machine is triggered to process the commands. The Agent within the active machine of the clustered machine will interpret the commands, perform the necessary function(s) required by the commands, and send the requested information to controller 402. The process then proceeds to block 612.

In block 612, controller 402 receives the requested information through virtual non-persistent connection 504 via local agent 502. Controller 502 will then send the requested information to the requesting entity (i.e., administrator 104 or clients 102). The process then proceeds to block 614, where virtual connection 504 is closed. In an alternative embodiment, virtual connection 504 may be closed prior to sending the requested information to the requesting entity.

Figure 7:
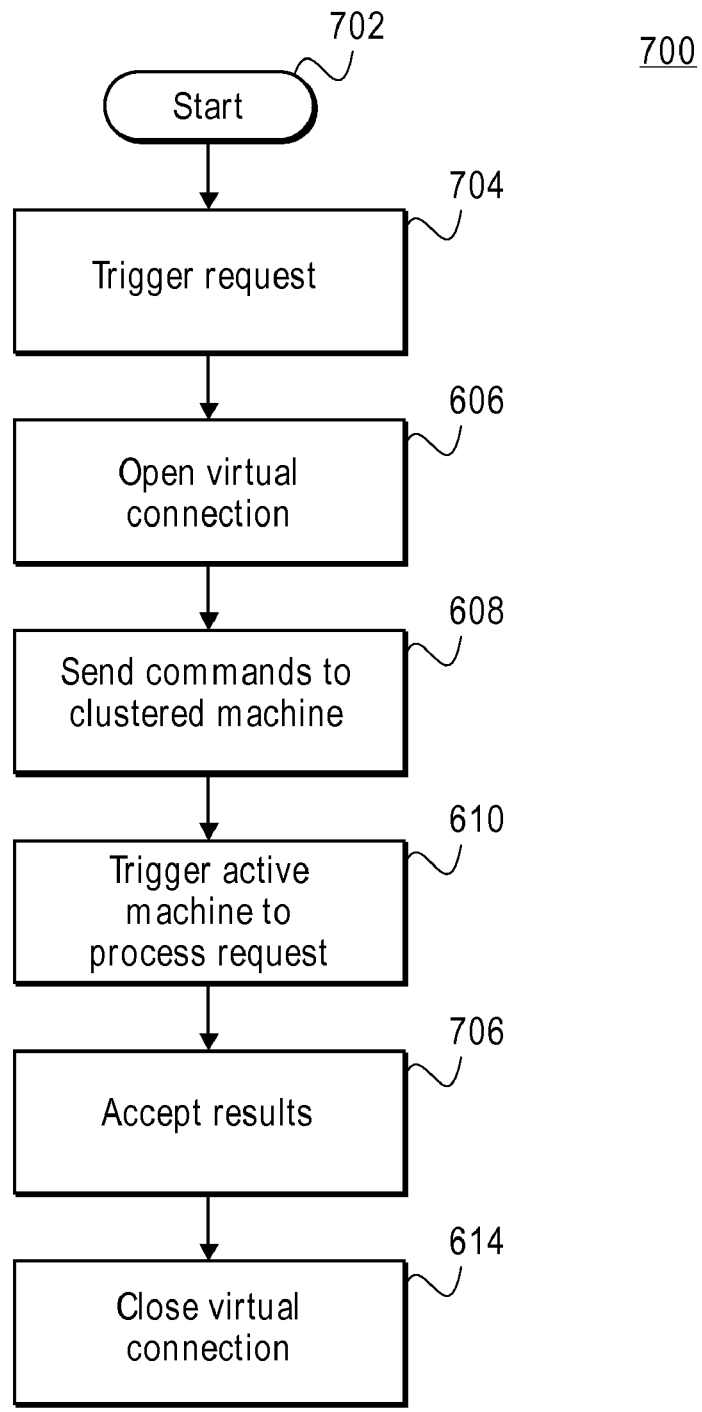
FIG. 7 is a flow diagram describing a method for enabling a controller in an agent-based open control technology architecture to trigger a request for information from a shared resource and/or service according to an embodiment of the present invention.

Controller 502 is also capable of triggering a request for information from a shared resource and/or service for its own edification. Such information may include, but is not limited to, a status check of a shared resource and/or service. FIG. 7 is a flow diagram 700 describing a method for enabling a controller in an agent-based open control technology architecture to trigger a request for information from a shared resource and/or service according to an embodiment of the present invention. The invention is not limited to the embodiment described herein with respect to flow diagram 700. Rather, it will be apparent to persons skilled in the relevant art(s) after reading the teachings provided herein that other functional flow diagrams are within the scope of the invention.

The process of method 700 is similar to the process of method 600 described in blocks 606-610 of FIG. 6. The process begins with block 702 and immediately proceeds to block 704. Unlike the process of block 604 in FIG. 6, where controller 402 receives a request to manipulate a shared resource and/or service, in block 704, controller 402 generates the request on its own. That is, controller 402 triggers a request for information (in the form of commands) that controller 402 needs from a shared resource and/or service. The process then continues through blocks 606-610 as described above with reference to FIG. 6. After the Agent sends the requested information to controller 402 from the active machine in clustered machine 408 via virtual non-persistent connection 504, the process proceeds to block 706.

In block 706, controller 402 receives the information from the active machine in clustered machine 408. In one embodiment, controller 402 may notify administrator 104, if necessary, regarding the status of the shared resource/service in which information was obtained. The process then proceeds to block 614. In block 614, virtual connection 504 is closed by local agent 502 via controller 402.

In embodiments of the present invention, non-persistent virtual connections, such as non-persistent virtual connection 504, are constantly being created and destroyed. In one embodiment of the invention, a security provision exists to ensure the security of the non-persistent virtual connection. The security provision protects the agent-based system from a hacker trying to fool the failover-clustered machines into thinking that a connection from the hacker is a trusted connection from the controller and local agent. The security provision is accomplished using the persistent connection. The persistent connection (also referred to as a trusted connection) is used to pass "secret" information, such as, but not limited to, a token, username, password, etc., to the failover-clustered machine. The "secret" information is used to create the non-persistent virtual connection. That is, if the "secret" information is not provided by the non-persistent virtual connection, the failover-clustered machine will not accept the connection.

In one embodiment, the secret information includes a public encryption key exchange. Once the secret information has been given to the failover-clustered machine via the persistent connection, the controller and the local agent via the non-persistent connection must use the public key to encrypt messages sent to the failover-clustered machine and the failover-clustered machine must use a private key to decrypt/verify the messages. This provision makes sure that messages from the controller are authentic.

Figure 8:
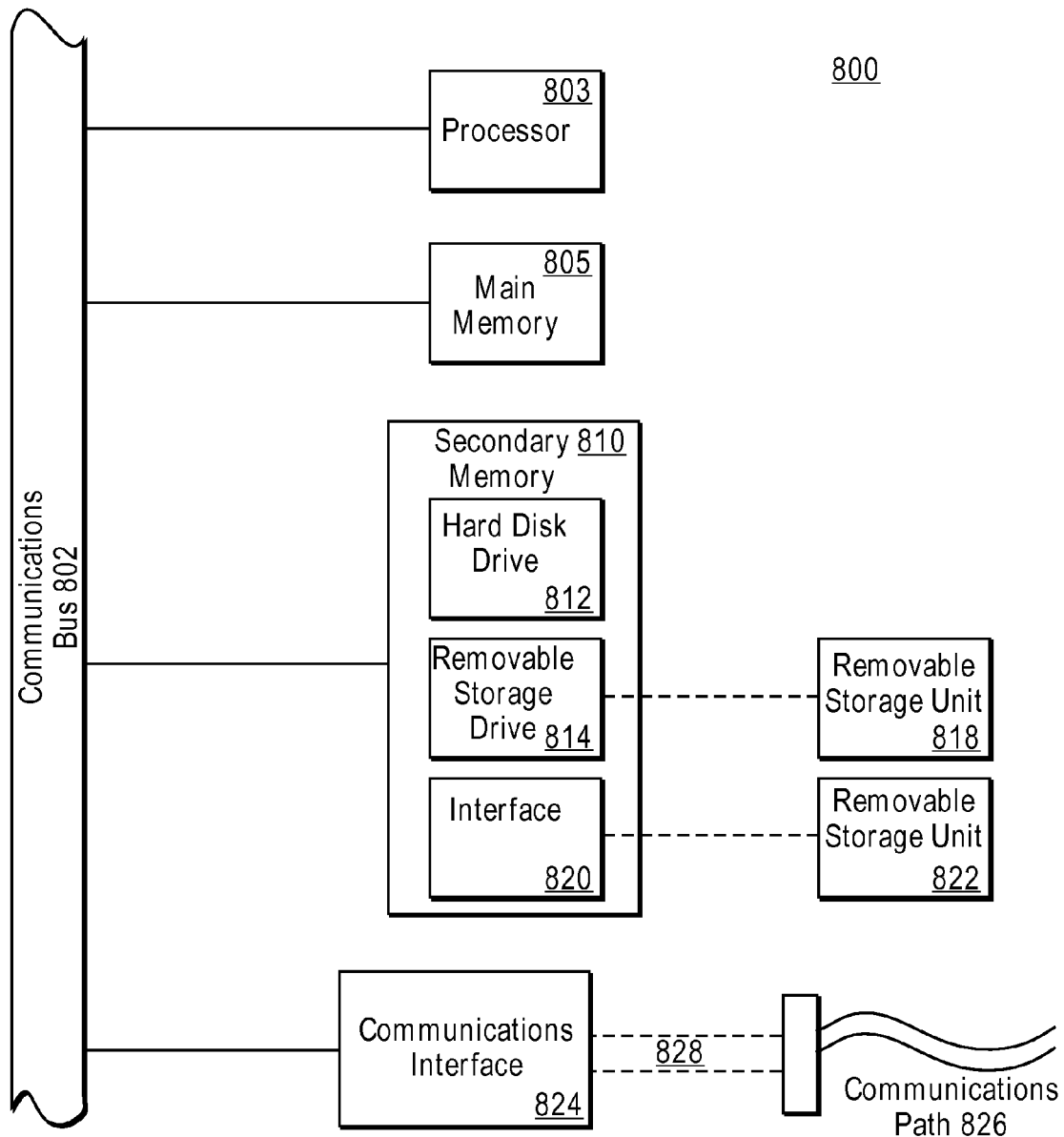
FIG. 8 is a block diagram illustrating an exemplary computer system in which certain aspects of embodiments of the present invention may be implemented.

Embodiments of the present invention may be implemented using hardware, software, or a combination thereof and may be implemented in one or more computer systems or other processing systems. In fact, in one embodiment, the invention is directed toward one or more computer systems capable of carrying out the functionality described here. An example implementation of a computer system 800 is shown in FIG. 8. Various embodiments are described in terms of this exemplary computer system 800. After reading this description, it will be apparent to a person skilled in the relevant art how to implement the invention using other computer systems and/or computer architectures.

Computer system 800 includes one or more processors, such as processor 803. Processor 803 is connected to a communication bus 802. Computer system 800 also includes a main memory 805, preferably random access memory (RAM), and may also include a secondary memory 810. Secondary memory 810 may include, for example, a hard disk drive 812 and/or a removable storage drive 814, representing a floppy disk drive, a magnetic tape drive, an optical disk drive, etc. Removable storage drive 814 reads from and/or writes to a removable storage unit 818 in a well-known manner. Removable storage unit 818 represents a floppy disk, magnetic tape, optical disk, etc., which is read by and written to by removable storage drive 814. As will be appreciated, removable storage unit 818 includes a computer usable storage medium having stored therein computer software and/or data.

In alternative embodiments, secondary memory 810 may include other similar means for allowing computer programs or other instructions to be loaded into computer system 800. Such means may include, for example, a removable storage unit 822 and an interface 820. Examples of such may include a program cartridge and cartridge interface (such as that found in video game devices), a removable memory chip (such as an EPROM (erasable programmable read-only memory) or PROM (programmable read-only memory)) and associated socket, and other removable storage units 822 and interfaces 820 which allow software and data to be transferred from removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a PCMCIA (personal computer memory card international association) slot and card, a wireless LAN (local area network) interface, etc. Software and data transferred via communications interface 824 are in the form of signals 828 which may be electronic, electromagnetic, optical or other signals capable of being received by communications interface 824. These signals 828 are provided to communications interface 824 via a communications path (i.e., channel) 826. Channel 826 carries signals 828 and may be implemented using wire or cable, fiber optics, a phone line, a cellular phone link, a wireless link, and other communications channels.

In this document, the term "computer program product" refers to removable storage units 818, 822, and signals 828. These computer program products are means for providing software to computer system 800. Embodiments of the invention are directed to such computer program products.

Computer programs (also called computer control logic) are stored in main memory 805, and/or secondary memory 810 and/or in computer program products. Computer programs may also be received via communications interface 824. Such computer programs, when executed, enable computer system 800 to perform the features of the present invention as discussed herein. In particular, the computer programs, when executed, enable processor 803 to perform the features of embodiments of the present invention. Accordingly, such computer programs represent controllers of computer system 800.

In an embodiment where the invention is implemented using software, the software may be stored in a computer program product and loaded into computer system 800 using removable storage drive 814, hard drive 812 or communications interface 824. The control logic (software), when executed by processor 803, causes processor 803 to perform the functions of the invention as described herein.

In another embodiment, the invention is implemented primarily in hardware using, for example, hardware components such as application specific integrated circuits (ASICs). Implementation of hardware state machine(s) so as to perform the functions described herein will be apparent to persons skilled in the relevant art(s). In yet another embodiment, the invention is implemented using a combination of both hardware and software.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

We claim:

1. An agent-based management system, comprising:
   a controller;
   at least one clustered machine comprising a first machine and a second machine sharing a resource or service, each of the first and second machine comprising an individual agent; and a local agent coupled to the controller, the local agent to open a virtual non-persistent connection to the clustered machine, wherein the shared resource or service is to be accessed by the local agent through the virtual non-persistent connection using a virtual IP address in response to the controller receiving a user request to manipulate the shared resource or service, and wherein an individual agent of an active one of the first and second machines having access to the shared resource or service is to manipulate the shared resource or service and return information over the virtual non-persistent connection in response to commands sent by the local agent over the virtual non-persistent connection to enable the individual agents of the at least one clustered machine to be represented as a single object with the local agent as a single interface to the single object.

2. The system of claim 1, wherein each of the first and second machine comprises at least one non-clustered resource or service, the system further comprising at least two persistent connections, each of the at least two persistent connections coupled to the controller and to a respective one of the individual agents, the at least two persistent connections enabling the controller to access the at least one non-clustered resource or service via each of the at least two individual agents separately, enabling the at least two individual agents of the at least one clustered machine to be represented as at least two objects.

3. The system of claim 1, further comprising at least one non-clustered machine having an agent and at least one non-clustered resource or service, the at least one non-clustered machine coupled to the controller using a persistent connection for enabling the controller to access information from the at least one non-clustered resource or service.

4. The system of claim 1, wherein the controller is coupled to the Internet for enabling administrators and clients to communication with the controller.

5. The system of claim 2, wherein the persistent connection to one of the at least two individual agents is to convey a security token to the agent to identify the virtual non-persistent connection as a trusted connection from the local agent.

6. An agent-based management system, comprising:
a controller;
a local agent coupled to the controller;
at least one clustered machine, the at least one clustered machine comprising at least two individual agents, the at least two individual agents sharing at least one shared resource or service; and
a virtual non-persistent connection for coupling the at least two individual agents to the local agent, wherein the at least one shared resource or service is accessed by the local agent through the virtual non-persistent connection using a virtual IP address to enable the at least two individual agents of the at least one clustered machine to be represented as a single object, wherein each of the at least two individual agents comprises at least one non-clustered resource or service, the system further comprising at least two persistent connections, each of the at least two persistent connections coupled to the controller and to one of the at least two individual agents, the at least two persistent connections for enabling the controller to access the at least one non-clustered resource or service on each of the at least two individual agents separately, enabling the at least two individual agents of the at least one clustered machine to be represented as at least two objects, wherein the persistent connection to one of the at least two individual agents is to convey a security token to the agent to identify the virtual non-persistent connection as a trusted connection from the local agent.

* * * * *